US009007979B2

(12) United States Patent
Lee et al.

(10) Patent No.: US 9,007,979 B2
(45) Date of Patent: Apr. 14, 2015

(54) APPARATUS AND METHOD FOR TRANSMITTING AND RECEIVING DATA IN WIRELESS COMMUNICATION SYSTEM USING RELAY

(75) Inventors: Heesoo Lee, Daejeon (KR); Jae Young Ahn, Daejeon (KR); Jae Heung Kim, Daejeon (KR); Young Jo Ko, Daejeon (KR); Kyoung Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 139 days.

(21) Appl. No.: 13/121,636

(22) PCT Filed: Sep. 29, 2009

(86) PCT No.: PCT/KR2009/005565
§ 371 (c)(1),
(2), (4) Date: Mar. 29, 2011

(87) PCT Pub. No.: WO2010/036084
PCT Pub. Date: Apr. 1, 2010

(65) Prior Publication Data
US 2011/0205951 A1 Aug. 25, 2011

(30) Foreign Application Priority Data

Sep. 29, 2008 (KR) .................. 10-2008-0095228
Nov. 3, 2008 (KR) .................. 10-2008-0108482
Nov. 7, 2008 (KR) .................. 10-2008-0110614
Nov. 10, 2008 (KR) .................. 10-2008-0110784
Jul. 28, 2009 (KR) .................. 10-2009-0068880

(51) Int. Cl.
*H04H 20/71* (2008.01)
*H04L 5/00* (2006.01)
(Continued)

(52) U.S. Cl.
CPC .............. *H04L 5/0094* (2013.01); *H04B 7/155* (2013.01); *H04B 7/2606* (2013.01);
(Continued)

(58) Field of Classification Search
CPC ............ H04B 7/2606; H04B 7/15557; H04W 84/047; H04W 74/006; H04W 36/00
USPC .................... 370/312, 329–332, 432
See application file for complete search history.

(56) References Cited

U.S. PATENT DOCUMENTS

2006/0223557 A1 10/2006 Manohar
2007/0072600 A1 3/2007 Cho et al.
(Continued)

FOREIGN PATENT DOCUMENTS

CN 101052139 10/2007
CN 101150569 3/2008
(Continued)

OTHER PUBLICATIONS

Ericsson, "Efficient support of relays through MBSFN subframes," TSG-RAN WG1 #55, R1-084357, pp. 1-3, (2008).
(Continued)

*Primary Examiner* — Andrew Chriss
*Assistant Examiner* — Romani Ohri
(74) *Attorney, Agent, or Firm* — Nelson Mullins Riley & Scarborough LLP; Anthony A. Laurentano, Esq.; Lewis Lee, Esq.

(57) ABSTRACT

Disclosed are a data transmission/reception apparatus and method of a wireless communication system using a relay. The data transmission/reception apparatus of the relay sets a relay reception subframe (hereinafter, referred to as 'relay-rx-sub-frame'), and reports, to a terminal within a cell coverage, that the set relay-rx-subframe is a Multicast Broadcast Single Frequency Network (MBSFN) sub-frame, so that a legacy terminal may be provided with services in a wireless communication system using the relay.

9 Claims, 5 Drawing Sheets

(51) Int. Cl.
  *H04W 24/10* (2009.01)
  *H04B 7/155* (2006.01)
  *H04B 7/26* (2006.01)
  *H04W 36/00* (2009.01)
  *H04W 72/04* (2009.01)
  *H04W 72/08* (2009.01)
  *H04W 84/04* (2009.01)

(52) U.S. Cl.
  CPC ........... *H04L 5/0042* (2013.01); *H04L 5/0044* (2013.01); *H04L 5/0051* (2013.01); *H04L 5/0053* (2013.01); *H04L 5/0087* (2013.01); *H04W 24/10* (2013.01); *H04W 36/0088* (2013.01); *H04W 72/042* (2013.01); *H04W 72/085* (2013.01); *H04W 84/047* (2013.01)

(56) References Cited

U.S. PATENT DOCUMENTS

| | | | |
|---|---|---|---|
| 2008/0045141 A1* | 2/2008 | Suga | 455/7 |
| 2008/0081626 A1 | 4/2008 | Choi et al. | |
| 2008/0227461 A1* | 9/2008 | Dayal et al. | 455/452.2 |
| 2009/0046617 A1* | 2/2009 | Tenny et al. | 370/312 |
| 2011/0038321 A1* | 2/2011 | Kim et al. | 370/328 |
| 2011/0170475 A1* | 7/2011 | Raaf | 370/315 |
| 2011/0211467 A1* | 9/2011 | Bhat | 370/252 |

FOREIGN PATENT DOCUMENTS

| | | |
|---|---|---|
| CN | 101262635 | 9/2008 |
| JP | 2006-74325 | 3/2006 |
| WO | 2008/100209 A1 | 8/2008 |
| WO | 2008/115613 A1 | 9/2008 |
| WO | 2008/115614 A2 | 9/2008 |
| WO | 2008/115826 A1 | 9/2008 |
| WO | 2010/032053 A1 | 3/2010 |

OTHER PUBLICATIONS

Huawei, "MBSFN Subframe Allocation Signaling," 3GPP TSG-RAN-WG2 Meeting #61bis, R2-081889, pp. 1-5, (2008).

Qualcomm Europe, "Support of Rel-8 UEs by LET-A Relays," 3GPP RAN WG1 #54bis, R1-084054, pp. 1-18 (2008).

International Search Report and Written Opinion for Application No. PCT/KR2009/005565, pp. 1-13, dated Sep. 22, 2011.

3GPP TS 36.211 V8.3.0, "3rd Generation Partnership Project; Technical Specification Group Radio Access Network; Evolved Universal Terrestrial Radio Access (E-UTRA); Physical Channels and Modulation (Release 8)," 9 pages (2008).

3GPP TS 25.346 V8.1.0, "3rd Generation Partnership Project; Technical Specification Group Radio Access Network; Introduction of the Multimedia Broadcast Multicast Service (MBMS) in the Radio Access Network (RAN); Stage 2 (Release 8)," 64 pages (2008).

* cited by examiner

[Fig. 1]
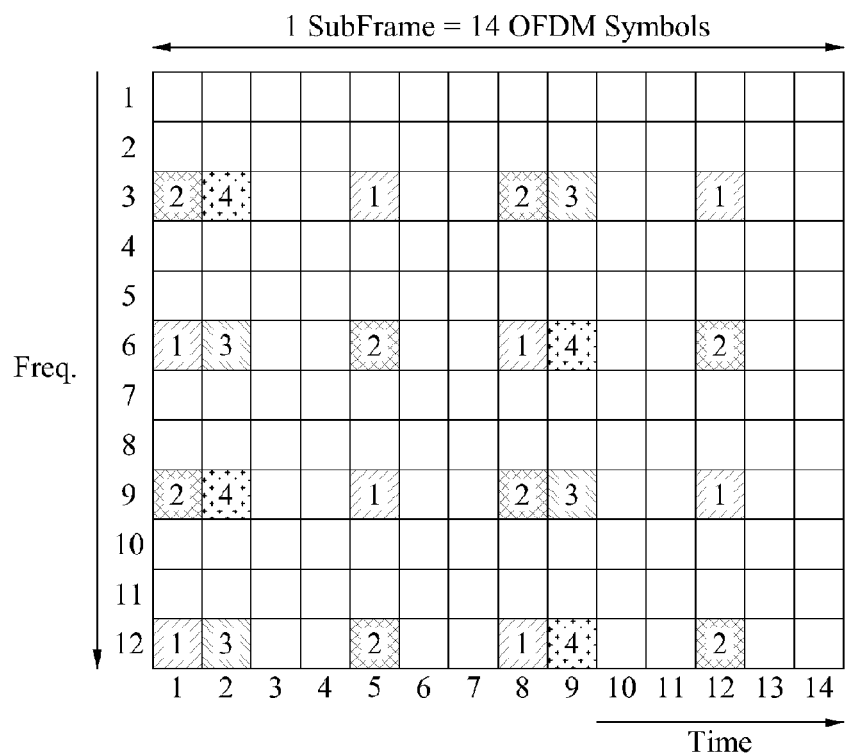
[Fig. 2]
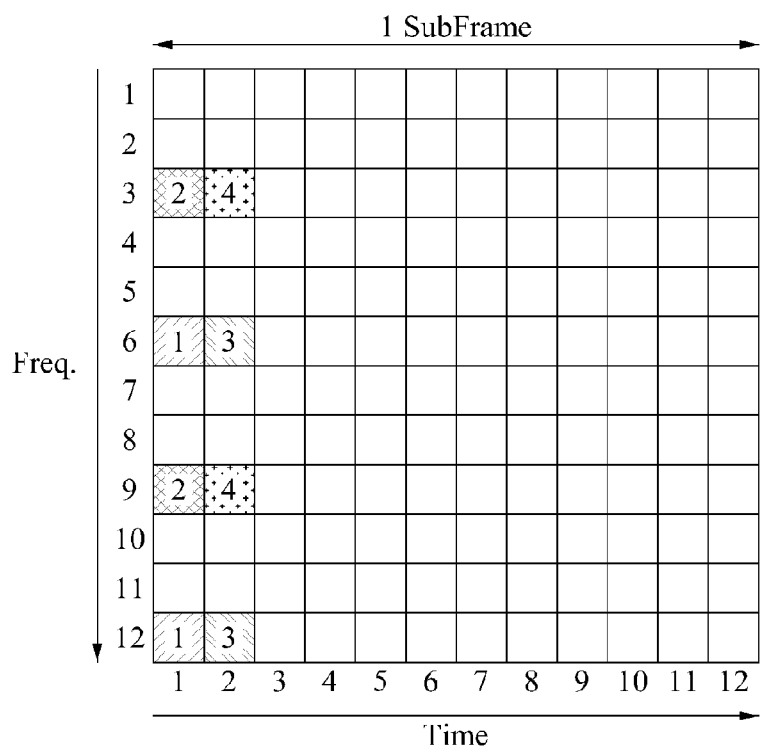

[Fig. 3]
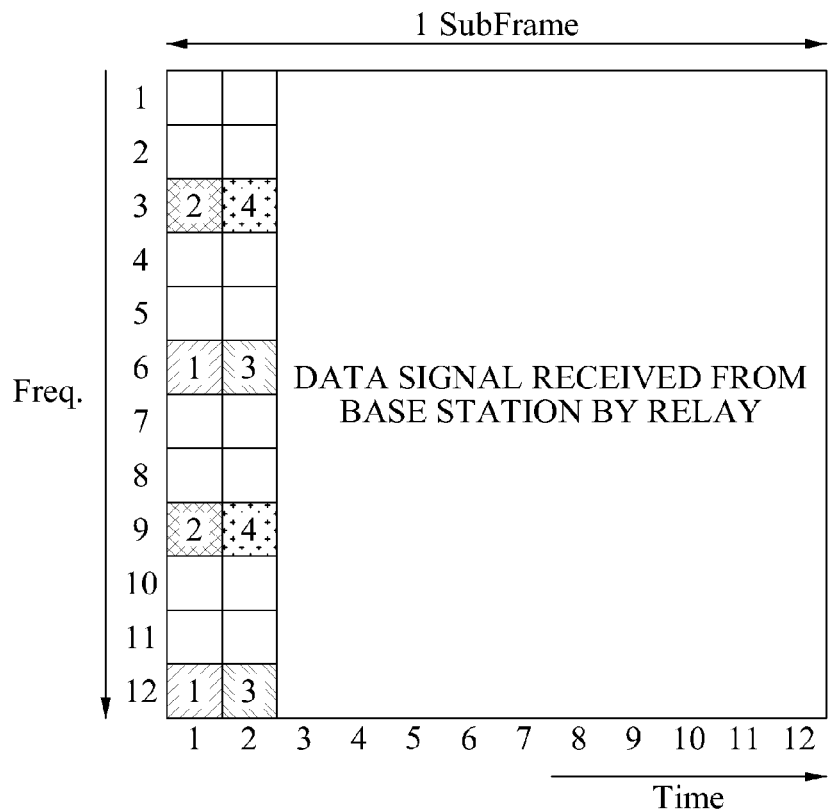
[Fig. 4]
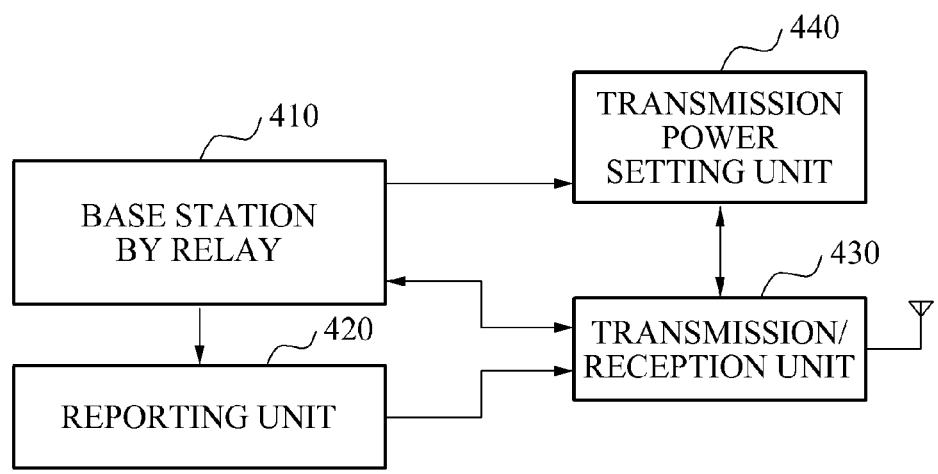

[Fig. 5]
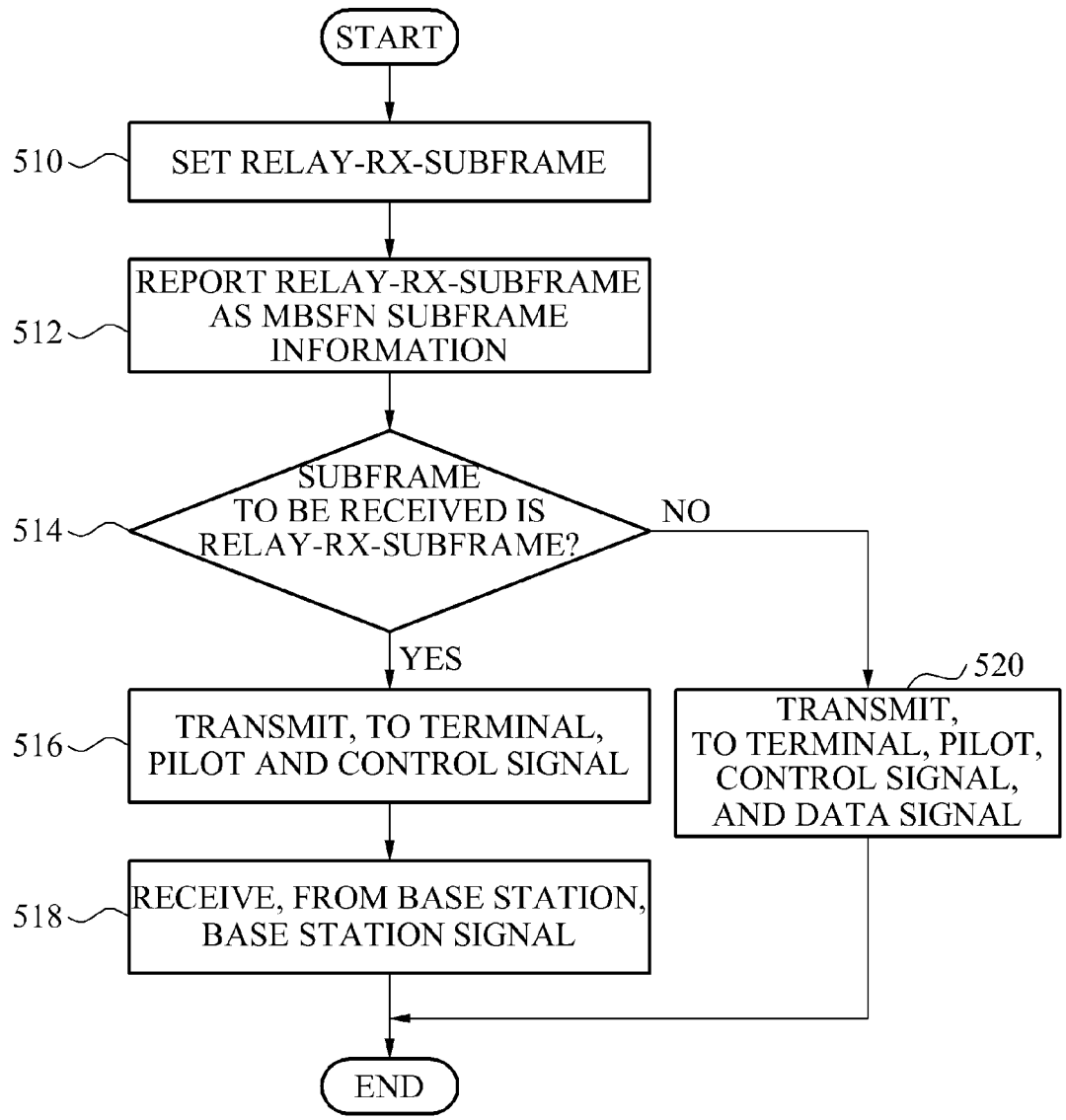

[Fig. 6]
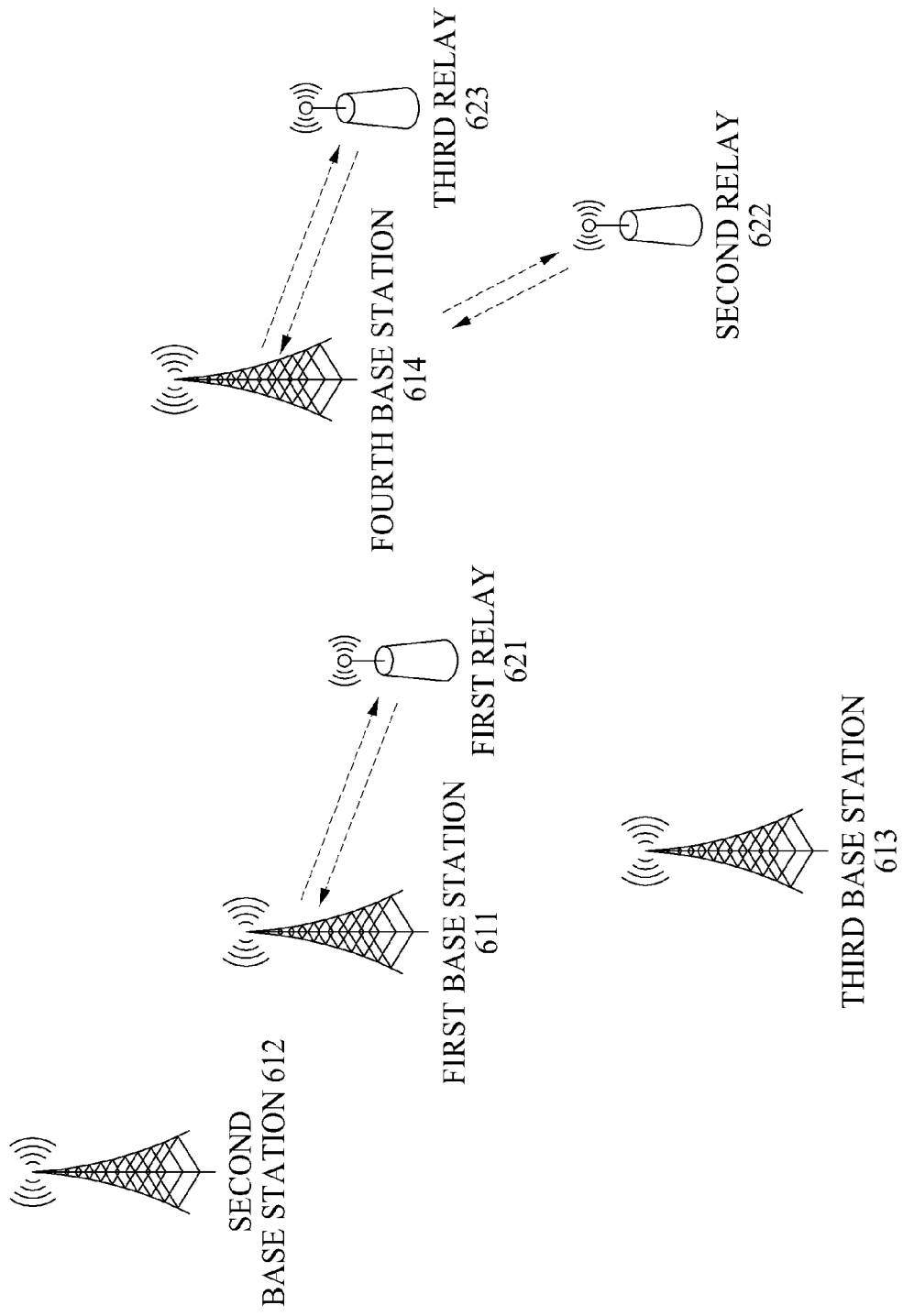

[Fig. 7]
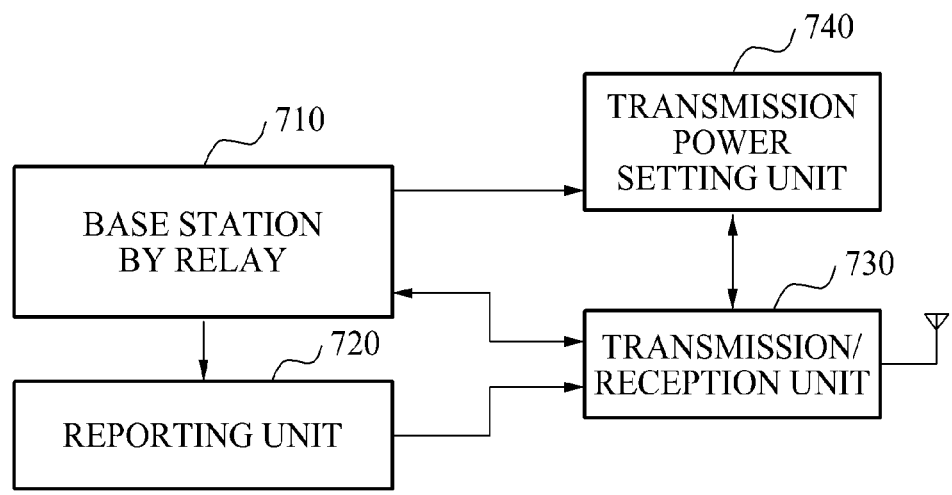

APPARATUS AND METHOD FOR TRANSMITTING AND RECEIVING DATA IN WIRELESS COMMUNICATION SYSTEM USING RELAY

RELATED APPLICATIONS

This application is a 35 U.S.C. §371 national stage filing of PCT Application No. PCT/KR2009/005565 filed on Sep. 29, 2009, which claims priority to, and the benefit of, Korean Patent Application No. 10-2008-0095228 filed Sep. 29, 2008; Korean Patent Application No. 10-2008-0108482 filed Nov. 3, 2008; Korean Patent Application No. 10-2008-0110614 filed Nov. 7, 2008; Korean Patent Application No. 10-2008-0110784 filed Nov. 10, 2008; and Korean Patent Application No. 10-2009-0068880 filed Jul. 28, 2009. The contents of the aforementioned applications are hereby incorporated by reference.

TECHNICAL FIELD

The present invention relates to an apparatus and method of effectively configuring a linkage between a base station and a relay in a wireless communication system using the relay, and more particularly, to an apparatus and method of enabling a relay to effectively provide services to a terminal (legacy User Element (UE)) of a system designed without considering the relay.

BACKGROUND ART

A relay may be a technique of expanding a cell coverage of a mobile/wireless communication network, or improving an effective throughput. Also, the relay may configure a backhaul in a wireless manner to reduce initial investment and operation costs.

A mobile/wireless communication system using the relay may basically need six types of wireless links. As the six types of wireless links, a wireless link (eNB-R) transmitting data from a base station to the relay, a wireless link (eNB-UE) transmitting data from the base station to a terminal, a wireless link (R-eNB) transmitting data from the relay to the base station, a wireless link (R-UE) transmitting data from the relay to the terminal, a wireless link (UE-eNB) transmitting data from the terminal to the base station, and a wireless link (UE-R) transmitting data from the terminal to the relay may be used.

In a current Third Generation Partnership Project Long Term Evolution (3GPP LTE) Rel-8 system, a cell-specific reference signal (RS) may need to be transmitted to all subframes of a downlink. By using the cell-specific RS, an LTE Rel-8 terminal may measure a Channel Quality Indicator (CQI) to report the measured CQI to the base station. Also, the LTE Rel-8 terminal may perform a channel estimation using the cell-specific RS so as to demodulate data.

An LTE Rel-8 frame structure may have a problem in operations of the LTE Rel-8 terminal when the relay provides services to the LTE Rel-8 terminal. Without considering the relay, an existing LTE Rel-8 terminal (legacy UE) may determine that the cell-specific RS is present in all frames. However, in a wireless link (eNB-R) interval transmitting data from the base station to the relay, the relay may need to receive data from the base station, and thereby may not transmit a signal. In this manner, when the relay does not transmit the cell-specific RS in a specific subframe, terminals provided with services from the relay may have a problem in that the terminal fails to recognize the base station.

Accordingly, in the wireless link (eNB-R) interval transmitting data from the base station to the relay, the terminal may determine a wireless link quality of the relay, providing services to the terminal, to be not satisfactory, even though the wireless link quality is superior. The terminal may request to perform an unnecessary handover to another cell, and a CQI value of a wireless channel being reported from the terminal to the relay may be inaccurate. Also, the channel estimation may be significantly inaccurately performed, and thereby a demodulation error of data may be significantly increased.

DISCLOSURE OF INVENTION

Technical Problem

An aspect of the present invention provides an apparatus and method of providing services, using a relay, to a legacy terminal designed without considering the relay.

Another aspect of the present invention provides a data transmission/reception apparatus and method that may enable a terminal within a cell coverage of a relay to effectively measure a wireless channel when a wireless link interval transmitting data from a base station to the relay is present.

Solution to Problem

According to an aspect of the present invention, there is provided a data transmission/reception apparatus of a relay, including: a subframe setting unit to set a relay reception subframe (hereinafter, referred to as 'relay-rx-subframe'); a reporting unit to report, to a terminal, that the set relay-rx-subframe is a Multicast Broadcast Single Frequency Network (MBSFN) subframe; and a transmission/reception unit to transmit a cell-specific reference signal or a control signal to the terminal during a predetermined interval of the relay-rx-subframe when a current subframe is the relay-rx-subframe, and to receive a base station signal from a base station during a remaining interval of the relay-rx-subframe.

In this instance, a case where a magnitude of a predetermined interval within a reception subframe, transmitting a cell-specific reference signal (RS) and a control signal, is zero, that is, a case of transmitting no the cell-specific RS and the control signal in the reception subframe may be included in the present invention.

According to an aspect of the present invention, there is provided a data transmission/reception apparatus of a base station, including: a subframe setting unit to determine a relay-rx-subframe to report, to a relay, information about the determined relay-rx-subframe, or to receive, from the relay, a report of the information about the relay-rx-subframe determined in the relay, and a transmission unit to prevent data from being transmitted to the relay during a predetermined period of time when a current subframe is the relay-rx-subframe, and to transmit a base station transmission signal to the relay during a remaining period of time.

According to another aspect of the present invention, there is provided a terminal that does not consider a blank subframe as a valid subframe for estimating a Channel Quality Indicator (CQI) when estimating the CQI.

According to another aspect of the present invention, there is provided a data transmission/reception method of a relay, including: setting a relay-rx-subframe; reporting, to a terminal, that the set relay-rx-subframe is an MBSFN subframe; transmitting a cell specific reference signal or a control signal to the terminal during a predetermined interval of the relay-rx-subframe when a current subframe is the relay-rx-subframe; and receiving a base station signal from a base station during a remaining interval of the relay-rx-subframe.

In this instance, a case where a magnitude of a predetermined interval within a reception subframe, transmitting a cell-specific RS and a control signal, is zero, that is, a case of transmitting no the cell-specific RS and the control signal in the reception subframe may be included in the present invention.

According to an aspect of the present invention, there is provided a data transmission/reception method of a base station, including: setting a relay-rx-subframe; and preventing data from being transmitted to a relay during a predetermined interval of the relay-rx-subframe, and transmitting the data to the relay during a remaining interval of the relay-rx-subframe when a current subframe is the relay-rx-subframe.

Advantageous Effects of Invention

As described above, according to exemplary embodiments of the present invention, there are provided a data transmission/reception apparatus and method in a wireless communication system using a relay, that may set a relay reception subframe (hereinafter, referred to as 'relay-rx-subframe') and report, to a terminal, that the set relay-rx-subframe is a Multicast Broadcast Single Frequency Network (MBSFN) subframe. A legacy terminal of a relay cell may not use a predetermined interval of the relay-rx-subframe reported as the MBSFN subframe when measuring a wireless channel. Accordingly, it is possible to reduce to measure a wireless channel inaccurately.

BRIEF DESCRIPTION OF DRAWINGS

FIG. 1 illustrates a structure of a non-Multicast Broadcast Single Frequency Network (MBSFN) subframe;

FIG. 2 illustrates a structure of an MBSFN subframe;

FIG. 3 illustrates an example of a structure of a relay reception subframe (hereinafter, referred to as 'relay-rx-subframe') signaled into an MBSFN subframe according to an exemplary embodiment of the present invention;

FIG. 4 illustrates a data transmission/reception apparatus of a relay according to an exemplary embodiment of the present invention;

FIG. 5 is a flowchart illustrating a data transmission/reception process of a relay reporting a relay-rx-subframe as an MBSFN subframe according to exemplary embodiment of the present invention;

FIG. 6 illustrates a configuration of a wireless communication system using a relay according to exemplary embodiment of the present invention; and FIG. 7 illustrates a data transmission/reception apparatus of a base station according to exemplary embodiment of the present invention.

MODE FOR THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

The present invention relates to a data transmission/reception apparatus and method that may overcome a phenomenon that a legacy terminal designed without considering a relay fails to recognize a base station in a wireless link interval where data is transmitted from a base station to the relay.

According to exemplary embodiments of the present invention, there is provided a method of reporting, as a Multicast Broadcast Single Frequency Network (MBSFN) subframe, a relay reception subframe (hereinafter, referred to as 'relay-rx-subframe') used in a wireless link interval where data is transmitted from the base station to the relay.

A Third Generation Partnership Project Long Term Evolution (3GPP LTE) system may use an MBSFN subframe to provide a Multimedia Broadcast and Multicast Service (MBMS). The MBSFN subframe used for providing the MBMS may have a partially different structure from that of the non-MBSFN subframe, as illustrated in FIGS. 1 and 2.

FIG. 1 illustrates a structure of a non-MBSFN subframe, and FIG. 2 illustrates a structure of an MBSFN subframe. In FIGS. 1 and 2, the structures of the non-MBSFN subframe and MBSFN subframe in a case of four cell-specific antenna ports are illustrated.

In FIGS. 1 and 2, a cell-specific reference signal (RS) may be transmitted on marked resource elements, and numerals on the resource elements may indicate a cell-specific antenna port number.

Referring to FIG. 1, as for the non-MBSFN subframe, the cell-specific RS may exist in six Orthogonal Frequency Division Multiplexing (OFDM) symbols. Referring to FIG. 2, the cell-specific RS may exist in two front OFDM symbols of the MBSFN subframe. A number of OFDM symbols where the cell-specific RS exists in the MBSFN subframe may vary depending on a number of the cell-specific antenna ports, and a maximum number of the OFDM symbols may be two. In the MBSFN subframe where the cell-specific reference signal exists in the two front OFDM symbols of the MBSFN subframe, MBMS data may be transmitted during a remaining interval.

FIG. 3 illustrates an example of a structure of a relay-rx-subframe signaled as an MBSFN subframe according to an exemplary embodiment of the present invention.

Referring to FIG. 3, a relay may transmit, to a terminal within a cell coverage, the cell-specific RS and a control signal during a predetermined interval of a reception subframe. The relay may receive a data signal from a base station during a remaining interval excluding the front predetermined interval. That is, the relay-rx-subframe may include an interval transmitting the cell-specific RS and the control signal and an interval receiving a base station signal from the base station. The present invention may include in a case where a magnitude of the predetermined interval within the relay-rx-subframe, transmitting the cell-specific RS and the control signal, is zero, that is, a case of not transmitting the cell-specific RS and the control signal in the relay-rx-subframe.

FIG. 4 illustrates a data transmission/reception apparatus of a relay according to an exemplary embodiment of the present invention. Referring to FIG. 4, the data transmission/reception apparatus of the relay includes a subframe setting unit 410, a reporting unit 420, a transmission/reception unit 430, and a transmission power setting unit 440.

The subframe setting unit 410 may determine which subframes are used for receiving a signal from the base station. That is, the subframe setting unit 410 may set a relay-rx-subframe.

The subframe setting unit 410 may receive, from the base station, subframe information used as the relay-rx-subframe, and set a subframe determined by the base station as the relay-rx-subframe. That is, the base station may be a subject to set the relay-rx-subframe.

The subframe setting unit 410 may determine a subframe intended to be used as the relay-rx-subframe, and transmit, to the base station, the subframe information intended to be used as the relay-rx-subframe to thereby set the relay-rx-subframe. That is, the relay may be a subject to set the relay-rx-subframe.

The subframe setting unit 410 may receive, from the base station, candidate subframe information for the relay-rx-subframe or non-candidate subframe information to be unselected as the relay-rx-subframe. The subframe setting unit 410 may determine a subframe used as the relay-rx-subframe based on the candidate subframe information or non-candidate subframe information, and transmit, to the base station, the subframe information used as the relay-rx-subframe to thereby set the relay-rx-subframe. That is, the relay-rx-subframe maybe set through a cooperation between the base station and the relay.

The subframe setting unit 410 may transmit, to the base station, the candidate subframe information for the relay-rx-subframe and the non-candidate subframe information to be unselected as the relay-rx-subframe. The subframe setting unit 410 may receive, from the base station, relay-rx-subframe information determined based on the candidate subframe information or the non-candidate subframe information, and set, as the relay-rx-subframe, a subframe determined by the base station. That is, a reception subframe may be set through a cooperation between the base station and the relay.

When at least one base station and at least one relay are present in a service area as illustrated in FIG. 6, information about subframes set for a wireless link (eNB-R) transmitting data from the base station to the relay or information about subframes set for a wireless link (R-eNB) transmitting data from the relay to the base station may be transmitted to a neighboring base station or neighboring relays.

FIG. 6 illustrates a configuration of a wireless communication system using a relay according to exemplary embodiment of the present invention. Referring to FIG. 6, a first base station 611 and a first relay 621 may report, to neighboring base stations 612, 613, and 614, or neighboring relays 622, and 623, subframes set for a linkage between the first base station 611 and the first relay 621.

The neighboring base stations and the neighboring relays may acquire the above described reported information, and the acquired information may be used for assignment of a subframe for a link between a base station and a relay. In FIG. 6, the first base station 611 or the first relay 621 may report, to a second relay 622, a third relay 623, or a fourth base station 614, a subframe used for a linkage between the first base station 611 and the first relay 621. The second relay 622, the third relay 623, or the fourth base station 614 may utilize the above described information in determining a subframe used for a backhaul link.

The subframe setting unit 410 may receive information about subframes used for a backhaul link between the neighboring base station and the neighboring relay.

The subframe setting unit 410 may report, to the neighboring base station or the neighboring relay, information about subframes used for a backhaul link between the base station and the relay.

The subframe setting unit 410 may preferentially set the subframes used for the backhaul link between the neighboring base station and the neighboring relay, when setting the subframes used for the backhaul link between the base station and the relay.

As another method of setting the reception subframe, the subframe setting unit 410 may set the reception subframe in a higher priority order depending on a predetermined priority of the subframe.

The reporting unit 420 may report, to terminals, the relay-rx-subframe. A terminal designed without considering the relay may not classify the relay-rx-subframe.

The reporting unit 420 may report the set relay-rx-subframe as an MBSFN subframe. The reporting may be performed through a broadcasting channel being received by all terminals.

The reporting unit 420 may report, to terminals, information about an MBSFN subframe of the neighboring cell as well as an MBSFN subframe of a corresponding relay.

The reporting unit 420 may report, to the terminals, the information about the MBSFN subframe of the neighboring cell together with identification information of the neighboring cell.

The set relay-rx-subframe may be reported as a blank subframe. In this instance, the reporting unit 420 may report, to the terminals, information about a blank subframe of the neighboring cell as well as a blank subframe of a corresponding relay.

The reporting unit 420 may report, to the terminals, the information about the blank subframe of the neighboring cell together with identification information of the neighboring cell.

The transmission/reception unit 430 may receive the relay-rx-subframe reported as the MBSFN subframe.

The transmission/reception unit 430 may transmit, to the terminals, a cell-specific reference signal (RS) or a control signal during a predetermined interval when a current subframe is the relay-rx-subframe reported as the MBSFN subframe as illustrated in FIG. 3. The transmission/reception unit 430 may receive a base station transmission signal during a remaining interval excluding the predetermined interval. In this instance, the base station may not transmit, to the relay, a base station signal during an interval where the relay transmits the cell-specific RS and the control signal. In this instance, the present invention may include a case where a magnitude of the predetermined interval transmitting the cell-specific RS and the control signal is zero.

The transmission/reception unit 430 may transmit, to a terminal of a cell coverage of a relay, a reference signal, the control signal, and data signal, when the current subframe is not the relay-rx-subframe.

The transmission power setting unit 440 may set a transmission power of each channel.

Hereinafter, a data transmission/reception method for preventing a phenomenon that a legacy terminal designed without considering a relay fails to recognize a base station in a wireless link interval where data is transmitted from a base station to the relay., will be described in detail with reference to FIG. 5.

FIG. 5 is a flowchart illustrating a data transmission/reception process of a relay reporting a relay-rx-subframe as an MBSFN subframe according to exemplary embodiment of the present invention.

Referring to FIG. 5, the relay according to an exemplary embodiment of the present invention may set a relay-rx-subframe of receiving a base station signal in operation 510. The relay-rx-subframe may be determined and set by the relay, determined and set by the base station, or determined through a cooperation between the base station and the relay.

A method of setting the relay-rx-subframe may be determined in a higher priority order depending on a predetermined priority of a subframe. Also, a reception subframe set in a neighboring cell may be preferentially set as the relay-rx-subframe.

In operation 512, the relay may report that the set relay-rx-subframe is an MBSFN subframe. In this instance, the relay may report to terminals through a broadcast channel.

Also, the relay may report, to the terminal, information about a reception subframe of a neighboring cell as well as information about a reception subframe of a corresponding relay, together with identification information of the neighboring cell.

In operation 514, the relay may determine whether a current subframe is the relay-rx-subframe.

In operation 516, the relay transmits, to terminals, a cell-specific reference signal (RS) and a control signal during a predetermined interval when the current subframe is the relay-rx-subframe. In operation 518, the relay may receive, from a base station, a base station signal during a remaining interval of the relay-rx-subframe. The predetermined interval may be, for example, two symbol intervals or a zero symbol interval. That is, a case of not transmitting the cell-specific reference signal and the control signal may be included.

In operation 520, the relay may transmit, to terminals within the cell coverage, a reference signal, the control signal, and a data signal when the current subframe is not the relay-rx-subframe.

When the relay report that the relay-rx-subframe is the MBSFN subframe, terminals may perform actions described below. A terminal may recognize the relay-rx-subframe as the MBSFN subframe. When failing to receive, from the relay, a report that the MBMS is present, the terminal may disregard remaining signals excluding the front predetermined interval of the MBSFN subframe. The terminal may perform a channel estimation and calculate a quality of a wireless channel using the cell-specific RS expected to exist in the front predetermined interval.

In addition, a terminal of a 3GPP LTE system may measure a channel quality indicator (CQI) periodically or by a request, and need to report the measured CQI to the base station or the relay. The CQI should be measured in a valid subframe.

When the cell uses the blank subframe, the relay may transmit no signal in the blank subframe, or may transmit data using a subframe format which a terminal may not interpret. In this case, the terminal may inaccurately measure a CQI of a wireless channel in the blank subframe.

Accordingly, in qualifications of a valid subframe for estimating the CQI of the wireless channel according to an exemplary embodiment of the present invention, a qualification that the blank subframe may not be the valid subframe may be added. Thus, the qualifications of the valid subframe according to exemplary embodiments of the present invention are shown in below Table 1.

TABLE 1

Qualifications of valid subframe if it is configured as a downlink subframe for that UE,
if it is not an MBSFN subframe,
if it is not a blank subframe, and
if it is not within a configured measurement gap for that UE When a cell reports information about the blank subframe to a terminal, many terminals from among terminals existing in a boundary may interpret information of a neighboring cell. Accordingly, the terminals may interpret information about the neighboring cell and determine a location of the blank subframe of the neighboring cell. Also, the terminal may not measure a CQI of the neighboring cell in the blank subframe of the neighboring cell according to the qualifications of Table 1.

When the cell reports, to a terminal of a cell coverage, information about the blank subframe of the neighboring cell and information about the blank subframe of a corresponding cell together with identification information of the neighboring cell, the terminal may receive the reported information, and recognize the blank subframes of the neighboring cells. Also, the terminal may not measure a wireless channel quality for a corresponding neighboring cell in the blank subframe of the neighboring cell according to the qualifications of Table 1.

FIG. 7 illustrates a data transmission/reception apparatus of a base station according to an exemplary embodiment of the present invention. Referring to FIG. 7, the data transmission/reception apparatus of the relay includes a subframe setting unit 710, a reporting unit 720, a transmission/reception unit 730, and a transmission power setting unit 740.

The subframe setting unit 710 may determine which subframes are used for transmitting a signal to a relay. That is, the subframe setting unit 710 may set a relay-rx-subframe.

The subframe setting unit 710 may receive, from the relay, subframe information used as the relay-rx-subframe, and set a subframe determined by the relay as the relay-rx-subframe. That is, the relay may be a subject to set the relay-rx-subframe.

The subframe setting unit 710 may determine a subframe intended to be used as the relay-rx-subframe, and transmit, to the relay, the subframe information intended to be used as the relay-rx-subframe to thereby set the relay-rx-subframe. That is, the base station may be a subject to set the relay-rx-subframe.

The subframe setting unit 710 may receive, from the relay, candidate subframe information for the relay-rx-subframe or non-candidate subframe information to be unselected as the relay-rx-subframe. The subframe setting unit 710 may determine a subframe used as the relay-rx-subframe based on the candidate subframe information or non-candidate subframe information, and transmit, to the relay, the subframe information used as the relay-rx-subframe to thereby set the relay-rx-subframe. That is, the relay-rx-subframe may be set through a cooperation between the base station and the relay.

The subframe setting unit 710 may transmit, to the relay, the candidate subframe information for the relay-rx-subframe and the non-candidate subframe information to be unselected as the relay-rx-subframe. The subframe setting unit 710 may receive, from the relay, relay-rx-subframe information determined based on the candidate subframe information or the non-candidate subframe information, and set, as the relay-rx-subframe, a subframe determined by the relay. That is, a reception subframe may be set through a cooperation between the base station and the relay.

The subframe setting unit 710 may receive information about subframes used for a backhaul link between the neighboring base station and the neighboring relay.

The subframe setting unit 710 may report, to the neighboring base station or the neighboring relay, information about subframes used for a backhaul link between the base station and the relay.

The subframe setting unit 710 may preferentially set the subframes used for the backhaul link between the neighboring base station and the neighboring relay, when setting the subframes used for the backhaul link between the base station and the relay.

As another method of setting the reception subframe, the subframe setting unit 710 may set the reception subframe in a higher priority order depending on a predetermined priority of the subframe.

The reporting unit 720 may report, to terminals, information about an MBSFN subframe of the neighboring cell as well as an MBSFN subframe of a corresponding relay.

The reporting unit 720 may report, to the terminals, the information about the MBSFN subframe of the neighboring cell.

Also, the reporting unit 720 may report, to the terminals, the information about the MBSFN subframe of the neighboring cell together with identification information of the neighboring cell.

The reporting unit 720 may report, to the terminals, information about a blank subframe of the neighboring cell.

Also, the reporting unit 720 may report, to the terminals, information about the blank subframe of the neighboring cell together with the identification information of the neighboring cell.

The transmission/reception unit 730 may not transmit, to the relay, signals during a predetermined period of time, when a current subframe is the relay-rx-subframe. The transmission/reception unit 730 may transmit, to the relay, a base station transmission signal during a remaining interval. Here, a magnitude of the predetermined interval may be zero.

The transmission/reception unit 730 may set a transmission power of each channel.

The exemplary embodiments of the present invention may be recorded in a computer-readable recording media including program instructions to implement various operations embodied by a computer. The computer-readable medium may include program instructions, data files, a data structure or a combination thereof. The program instructions recorded in the computer-readable medium may be specially designed and constructed for the present invention, or be well known to those skilled in the field of computer software. Examples of computer-readable medium include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The hardware devices may be constructed to act as one or more software modules for performing the operation of the present invention, and vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for data relay in a relay station, comprising:
   obtaining information about a relay reception subframe;
   signaling to a terminal that the relay reception subframe is an MBSFN (Multicast Broadcast Single Frequency Network) subframe; and
   receiving data from a base station during the relay reception subframe,
   wherein the relay reception subframe includes a first period for transmitting a reference signal or a control signal to the terminal and a second period for receiving data by the relay station from the base station.

2. The method of claim 1, wherein the relay reception subframe is set by the base station.

3. The method of claim 1, wherein the relay reception subframe is set by the relay station or by cooperation between the base station and the relay station.

4. The method of claim 1, wherein the relay station transmits 1) no reference signal or no control signal, 2) one reference signal or one control signal, or 3) two reference signal or two control signal to the terminal during the first period.

5. A method for data transmission in a base station, comprising:
   setting a relay reception subframe for transmission from base station to relay station;
   transmitting information about the relay reception subframe to a relay station; and
   transmitting data to the relay station during the relay reception subframe,
   wherein the relay reception subframe is configured as an MBSFN (Multicast Broadcast Single Frequency Network) subframe,
   wherein the relay reception subframe includes a first period for relay transmission and a second period for relay reception,
   wherein the reference signal or the control signal is transmitted from the relay station to terminal during the first period and data is transmitted from the base station to the relay station and the data is received by the relay station during the second period.

6. The method of claim 5, wherein the relay reception subframe includes a first period for relay transmission and a second period for relay reception.

7. A method for data reception in a terminal, comprising:
   receiving data from a relay station; and
   receiving a reference signal or a control signal from the relay station during a relay reception subframe configured as an MBSFN (Multicast Broadcast Single Frequency Network) subframe,
   wherein the relay reception subframe includes a first period for relay transmission and a second period for relay reception,
   wherein the reference signal or the control signal is received from the relay station during the first period and data is transmitted from the base station to the relay station and the data is received by the relay station during the second period.

8. The method of claim 7, wherein the terminal receives 1) no reference signal or no control signal, 2) one reference signal or one control signal, or 3) two reference signal or two control signal from the relay station during the first period.

9. The method of claim 7, wherein the relay reception subframe is configured by a base station.

* * * * *